United States Patent
Agrawal et al.

(10) Patent No.: US 9,886,785 B2
(45) Date of Patent: *Feb. 6, 2018

(54) INDEXING AND QUERYING SPATIAL GRAPHS

(71) Applicant: International Business Machines Corporation, Armonk, NY (US)

(72) Inventors: Dakshi Agrawal, Monsey, NY (US); Raghu K. Ganti, Elmsford, NY (US); Kisung Lee, Atlanta, GA (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/747,275

(22) Filed: Jun. 23, 2015

(65) Prior Publication Data

US 2016/0196677 A1    Jul. 7, 2016

Related U.S. Application Data

(63) Continuation of application No. 14/591,480, filed on Jan. 7, 2015.

(51) Int. Cl.
*G06F 17/30* (2006.01)
*G06T 11/60* (2006.01)

(52) U.S. Cl.
CPC .......... *G06T 11/60* (2013.01); *G06F 17/3033* (2013.01); *G06F 17/30241* (2013.01); *G06F 17/30554* (2013.01); *G06F 17/30958* (2013.01)

(58) Field of Classification Search
CPC combination set(s) only.
See application file for complete search history.

(56) References Cited

U.S. PATENT DOCUMENTS

| 4,773,861 A | 9/1988 | Dufour et al. |
| 6,868,421 B1 | 3/2005 | Lin |

(Continued)

FOREIGN PATENT DOCUMENTS

| CN | 1808068 A | 7/2006 |
| CN | 102567439 A | 7/2012 |

(Continued)

OTHER PUBLICATIONS

"Circle of latitude", http://en.wikipedia.org/wiki/Circle_of_latitude, retrieved Jan. 7, 2015, 9 pages.

(Continued)

*Primary Examiner* — Shyue Jiunn Hwa
(74) *Attorney, Agent, or Firm* — Francis Lammes; Stephen J. Walder, Jr.; Kurt P. Goudy

(57) ABSTRACT

A mechanism is provided for spatial annotated graph queries. A geomap query is received to identify a number K-closest geometry objects within a distance D to a geo-location L. A geohash is computed for the geo-location L. A set of geometry objects are identified from an indexed set of geometry objects having at least NB common-prefix bits to a number of bits NB of the geo-location L. K-closest geometry objects are identified from the set of geometry objects that are closest to the geo-location L. The K-closest geometry objects are then returned to a user who submitted the geomap query.

7 Claims, 5 Drawing Sheets

(56) References Cited

U.S. PATENT DOCUMENTS

| | | |
|---|---|---|
| 7,302,343 B2 | 11/2007 | Beatty |
| 7,502,620 B2 | 3/2009 | Morgan et al. |
| 7,668,386 B2 | 2/2010 | Beatty |
| 8,050,689 B2 | 11/2011 | Riise et al. |
| 8,229,766 B2 | 7/2012 | Carttar et al. |
| 9,430,858 B1* | 8/2016 | Har ................. G06T 11/206 |
| 2003/0004995 A1 | 1/2003 | Novaes |
| 2005/0131660 A1 | 6/2005 | Yadegar et al. |
| 2006/0095588 A1 | 5/2006 | Van Lunteren |
| 2008/0052488 A1 | 2/2008 | Fritz et al. |
| 2010/0205364 A1 | 8/2010 | Gazit |
| 2011/0055290 A1* | 3/2011 | Li ............. G06F 17/30241 707/807 |
| 2011/0257923 A1 | 10/2011 | Boulton et al. |
| 2012/0047181 A1 | 2/2012 | Baudel et al. |
| 2012/0166347 A1 | 6/2012 | Lacal |
| 2012/0226889 A1 | 9/2012 | Merriman et al. |
| 2012/0246400 A1 | 9/2012 | Bhadra et al. |
| 2014/0164390 A1 | 6/2014 | Hampapur et al. |
| 2014/0266819 A1 | 9/2014 | Agrawal et al. |
| 2014/0278228 A1 | 9/2014 | Agrawal et al. |
| 2014/0279970 A1 | 9/2014 | Agrawal et al. |
| 2016/0171027 A1* | 6/2016 | Agrawal ........ G06F 17/30949 707/743 |

FOREIGN PATENT DOCUMENTS

| | | |
|---|---|---|
| CN | 102568035 A | 7/2012 |
| CN | 103714145 A | 4/2014 |
| EP | 1304652 A2 | 4/2003 |

OTHER PUBLICATIONS

"Dynamically report on dimension to multiple fact relationships with a single query", Disclosed Anonymously, www.ip.com, IPCOM000232196D, Oct. 25, 2013, 6 pages.

"Geodetic datum", http://en.wikipedia.org/wiki/Datum_%28geodesy%29, retrieved Mar. 1, 2013, 13 pages.

"Geohash", http://en.wikipedia.org/wiki/Geohash, retrieved Feb. 11, 2013, 6 pages.

"One-Dimensional Indexing for a Multi-Dimensional MDX Query", Disclosed Anonymously, www.ip.com, IPCOM000226436D, Apr. 3, 2013, 7 pages.

Agrawal, Dakshi et al., "Mapping Uncertain Geometries to Graticules", Provisional Application filed Mar. 15, 2013 (Expired), U.S. Appl. No. 61/794,397, 29 pages.

Yu, Hao et al., "A cache framework for geographical feature store", 20th International Conference on Geoinformatics, Hong Kong, Jun. 15-17, 2012, 4 pages.

List of IBM Patents or Patent Applications Treated as Related (Appendix P), Jun. 23, 2015, 2 pages.

* cited by examiner

INDEXING AND QUERYING SPATIAL GRAPHS

GOVERNMENT RIGHTS

This invention was made with Government support under Contract No.: W911NF-09-2-0053 awarded by the U.S. Army Research Office. The Government has certain rights in this invention.

BACKGROUND

The present application relates generally to an improved data processing apparatus and method and more specifically to mechanisms for indexing and querying spatial graphs.

Graph/link data are becoming increasingly available, with the explosion of social media, such as Twitter®, call graphs in telephone companies, or the like). Several products such as Database 2 Resource Description Framework (DB2 RDF), RDF-3X, and Oracle® Spatial/Graph now provide support for graph data storage and querying. Several of these graph data sources have spatial markers embedded as first class data citizens, which may come from various sources such as smartphones that are location enabled, cars with Global Positioning System (GPS) devices. With the exception of Oracle® Spatial/Graph, there is no support for indexing and retrieving spatial data from graph data stores. In the context of Oracle® Spatial/Graph, spatial data indexing is supported in an inefficient manner—spatial index is separately maintained in the spatial database and queries are answered by breaking down the query into a spatial counterpart and a graph counterpart. This results in significantly extra storage and the query inefficiency. There is no indexing support for graph/link data in the graph data store.

SUMMARY

In one illustrative embodiment, a method, in a data processing system, is provided for spatial annotated graph queries. The illustrative embodiment receives a geomap query to identify a number K-closest geometry objects within a distance D to a geo-location L. The illustrative embodiment computes a geohash for the geo-location L. The illustrative embodiment identifies a set of geometry objects from an indexed set of geometry objects having at least NB common-prefix bits to a number of bits NB of the geo-location L. The illustrative embodiment identifies K-closest geometry objects from the set of geometry objects that are closest to the geo-location L. The illustrative embodiment then returns the K-closest geometry objects to a user who submitted the geomap query.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
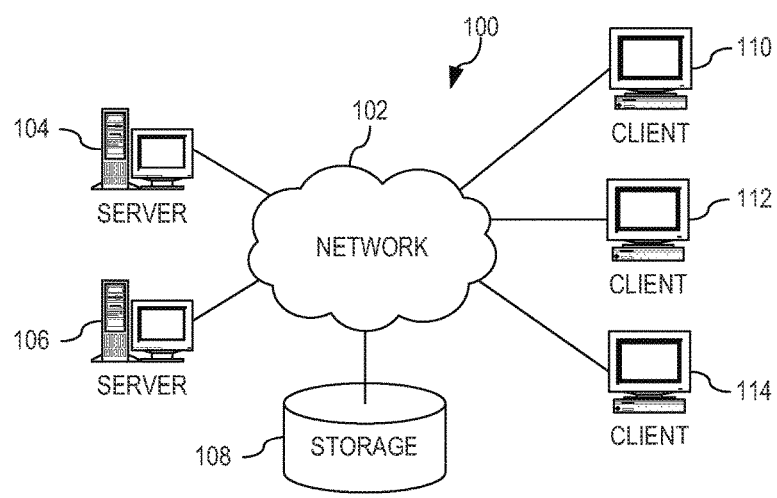
FIG. 1 is an example diagram of a distributed data processing system in which aspects of the illustrative embodiments may be implemented.

The illustrative embodiments provide mechanisms for enabling spatially annotated graph queries of graph databases via spatial indexing of a location in Resource Description Framework (RDF) data stores using a "single-dimensional" key representing the location. The mechanisms convert a two-dimensional spatial query into a single dimension key while still preserving the spatial locality. By constructing keys using a geohash of geometry objects (i.e. a coordinate pair) and constructing a prefix index on the keys, the mechanisms generate a spatial index on graph databases and allow for simple database operations to search through geospatial data resulting in faster geolocating responses, thereby improving the retrieval of spatial information from RDF data stores. Geohash is a latitude/longitude geocode system, which is a hierarchical spatial data structure that subdivides space into buckets of grid shape. By providing a geometry object that indicates an address, latitude and longitude coordinates, or the like, geohashing uniquely identifies a position on the Earth.

In some illustrative embodiments, the mechanisms of the illustrative embodiments operate to receive a set of geometry objects from a user that are to be indexed and stored for fast geomap lookups. For each geometry object in the set of geometry objects, the mechanisms compute a set of geohashes (i.e. bit strings) for the geometry object using a number of bits, the number of bits being a predetermined parameter chosen by the user. For example, a geohash of three geometry objects (GO) results in bit strings as follows:

geohash of GO (17.39843611, 78.469525)
=tepfcx7c0rwdjbd5zuzwm
geohash of GO (17.39833611, 78.469625)
=tepfcx7bducjrzvhp5t4n5
geohash of GO (17.49843611, 78.569525)
=tepgeckxhyq8sz7m7frbjb As is illustrated, geohashing enables locality preserving encoding of location data such that, if two points are closer to each other, the associated hash codes share a longer prefix. Particularly, since the first geometry code is close to the second geometry object, their geohashs have the first seven bits in common. Once the geohash for the particular geometry object has been generated, the mechanisms encode each geohash of the geometry object as a binary string, for ease of reading American Standard Code for Information Interchange (ASCII) strings. The mechanisms store the geometry object in graph database using the geohashes as bit strings and build a hashmap index, which is an n×n table of the geometry object and its associated encoded geohash. Once the mechanisms have indexed and stored all of the received geometry objects, then geometry objects may now be efficiently queried based on range queries of their associated geohashes (bit strings).

That is, in another illustrative embodiment, the mechanisms receive a geomap query to identify a number K-closest geometry objects within a distance D to a geo-location L. The mechanisms compute a geohash (bit string) for the given geo-location L and then identifies number of bits NB that are required to encode an accuracy of distance D using geohashes (bit strings). From the set of pre-computed geohashes of the geometry objects stored in the graph database using the hashmap index, the mechanisms identify all those geometry objects that have at least NB common-prefix bits to that of the number of bits NB of the geo-location L that are required to encode an accuracy of distance D using geohashes (bit strings). This identification uses exact equality or prefix matching to retrieve pruned results efficiently. As each geohash from the set of geohashses in the graph database are identified, the mechanisms add each identified geohash to a list of candidate results CR whose geohashes have at least NB common-prefix bits in common with the geohash the given geo-location L.

Once all geohashes of the set of geohashes in the graph database have been queried with respect to the given geo-location L, the mechanisms select a geometry object from the candidate results (CR) list and compute a distance between the location of the selected geometry object and the given geo-location L. If the mechanisms determine that the distance between the location of the selected geometry object and the given geo-location L is less than or equal to the distance D, the mechanisms add the geometry object to a list of final results (FR) along with the computed distance between the location of the selected geometry object and the given geo-location L. Once all the geometry objects from the list of candidate results CR has been examined, the mechanisms sort the final results (FR) list to identify the geometry objects with the shortest distance to the given geo-location L. The mechanisms then select the K-closest geometry objects from the final results (FR) list. It should be noted that if the final results (FR) list does not comprise K-closest geometry objects, the mechanisms may decrease the number of bits NB that are required to encode an accuracy of distance D using geohashes (bit strings) by one, thereby forming a new number of bits NNB, and repeat the process. Further, if the number of bits NB has been decreased past a predetermined threshold thereby decreasing the accuracy of distance D, then even though there may not be enough geometry objects in the final results (FR) to meet the number K-closest geometry objects, the mechanisms select all of the objects in the set of final results (FR) as the geometry objects that are within the distance D to the geo-location L and returns results to the user indicating the all results possible have been returned.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
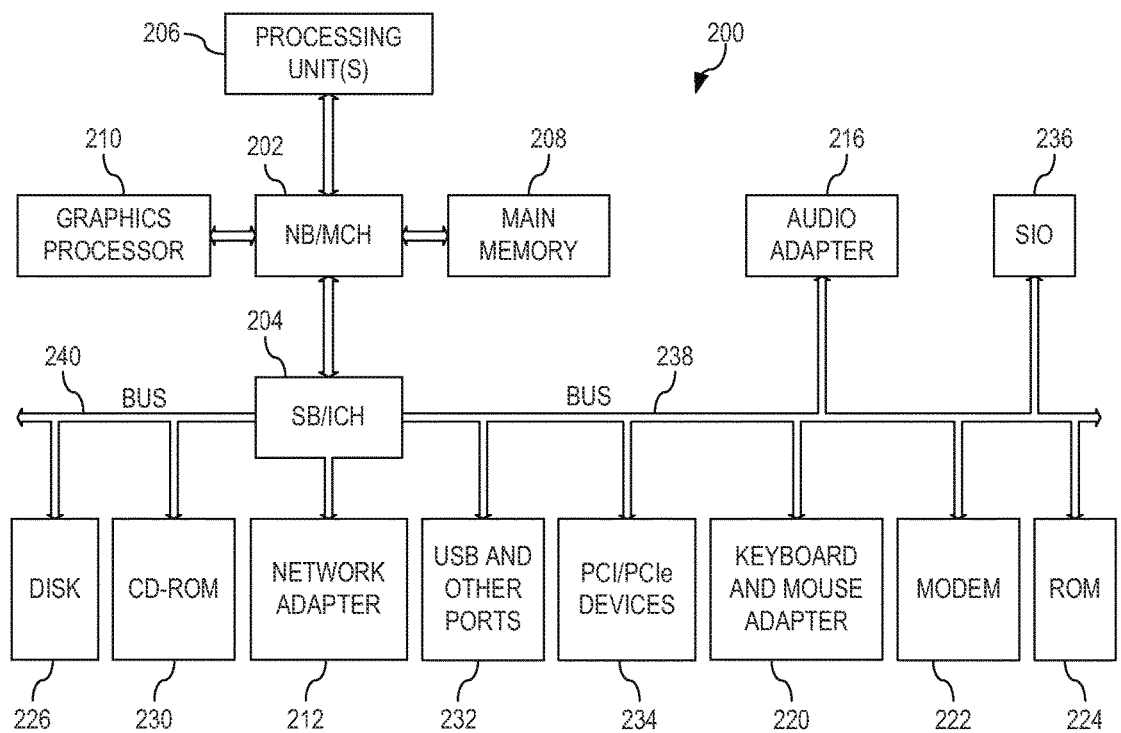
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
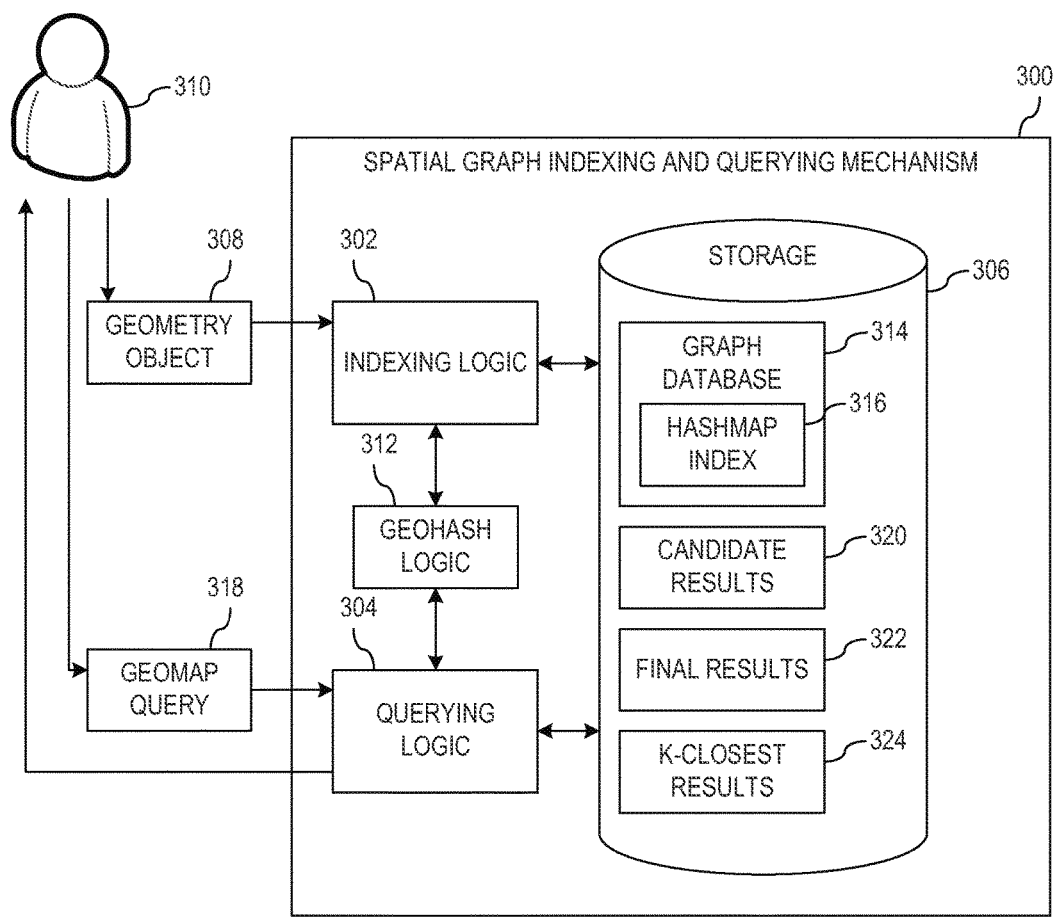
FIG. 3 depicts a functional block diagram describing a mechanism for indexing and querying spatial graphs in accordance with an illustrative embodiment.

In order to enable spatial indexing of a location in data stores using a "single-dimensional" key representing a location, FIG. 3 depicts a functional block diagram describing a mechanism for indexing and querying spatial graphs in accordance with an illustrative embodiment. Spatial graph indexing and querying mechanism 300 comprises indexing logic 302, querying logic 304, and storage 306. In operation, indexing logic 302 receives a set of geometry objects 308 from user 310 that are to be indexed and stored for fast geomap lookups. As each geometry object in the set of geometry objects 308 is received, indexing logic 302 utilizes geohashing logic 312 to compute a geohash (i.e. bit string) for the geometry object using a number of bits, the number of bits being a predetermined parameter chosen by user 310. Once geohashing logic 312 generates the geohash for the geometry object, indexing logic 302 encodes the geohash of the geometry object as a binary string, for ease of reading American Standard Code for Information Interchange (ASCII) strings. Indexing logic 302 then stores the geometry object in graph database 314 in storage 306 using the geohashes as bit strings. Associated with graph database 314, indexing logic 302 also builds hashmap index 316, which is an n×n table of the geometry objects and each geometry object's associated encoded geohash. Once indexing logic 302 has stored and indexed all of the received geometry objects, indexing logic 302 sends an acknowledgement to user 310 that geometry objects 308 may now be efficiently queried based on range queries of their associated geohashes (bit strings).

Upon user 310 submitting geomap query 318, querying logic 304 identifies, within geomap query 318, a number K-closest geometry objects within a distance D to a geo-location L. Querying logic 304 utilizes geohash logic 312 to compute a geohash (bit string) for the given geo-location L. Based on the computed geohash of geo-location L, querying logic 304 identifies a number of bits NB that are required to encode an accuracy of distance D using geohashes (bit strings). Querying the set of pre-computed geohashes of the geometry objects stored in graph database 314 utilizing hashmap index 316, querying logic 304 identifies all those geometry objects that have at least NB common-prefix bits to that of the number of bits NB of the geo-location L that are required to encode an accuracy of distance D using geohashes (bit strings). This identification uses exact equality or prefix matching to retrieve pruned results efficiently. As each geohash from the set of geohashes in the graph database are identified, querying logic 304 adds each identified geohash to candidate results (CR) 320 whose geohashes have at least NB common-prefix bits in common with the geohash the given geo-location L.

Once querying logic 304 has queried all geohashes of the set of geohashes in graph database 314 with respect to the given geo-location L, querying logic 304 selects a geometry object from candidate results (CR) 320 and computes a distance between the location of the selected geometry object and the given geo-location L. If querying logic 304 determines that the distance between the location of the selected geometry object and the given geo-location L is less than or equal to the distance D, querying logic 304 adds the geometry object to final results (FR) 322 along with the computed distance between the location of the selected geometry object and the given geo-location L. Once querying logic 304 examines all the geometry objects in candidate results (CR) 320, querying logic 304 sorts final results (FR) 322 to identify the geometry objects with the shortest distance to the given geo-location L. Querying logic 304 then selects the K-closest geometry objects from final results (FR) 322 and stores them in K-closest results 324. If querying logic 304 determines that, before analyzing final results (FR) 322, there are not enough geometry objects in final results (FR) 322 to meet the number K-closest geometry objects within a distance D to a geo-location L, querying logic 304 may decrease the number of bits NB that are required to encode an accuracy of distance D using geohashes (bit strings) by one, thereby forming a new number of bits NNB, and repeat the process. Further, if the number of bits NB has been decreased past a predetermined threshold thereby decreasing the accuracy of distance D, then even though there may not be enough geometry objects in final results (FR) 322 to meet the number K-closest geometry objects, querying logic 304 selects all of the objects in the set of final results (FR) 322 as the geometry objects that are within the distance D to the geo-location L.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
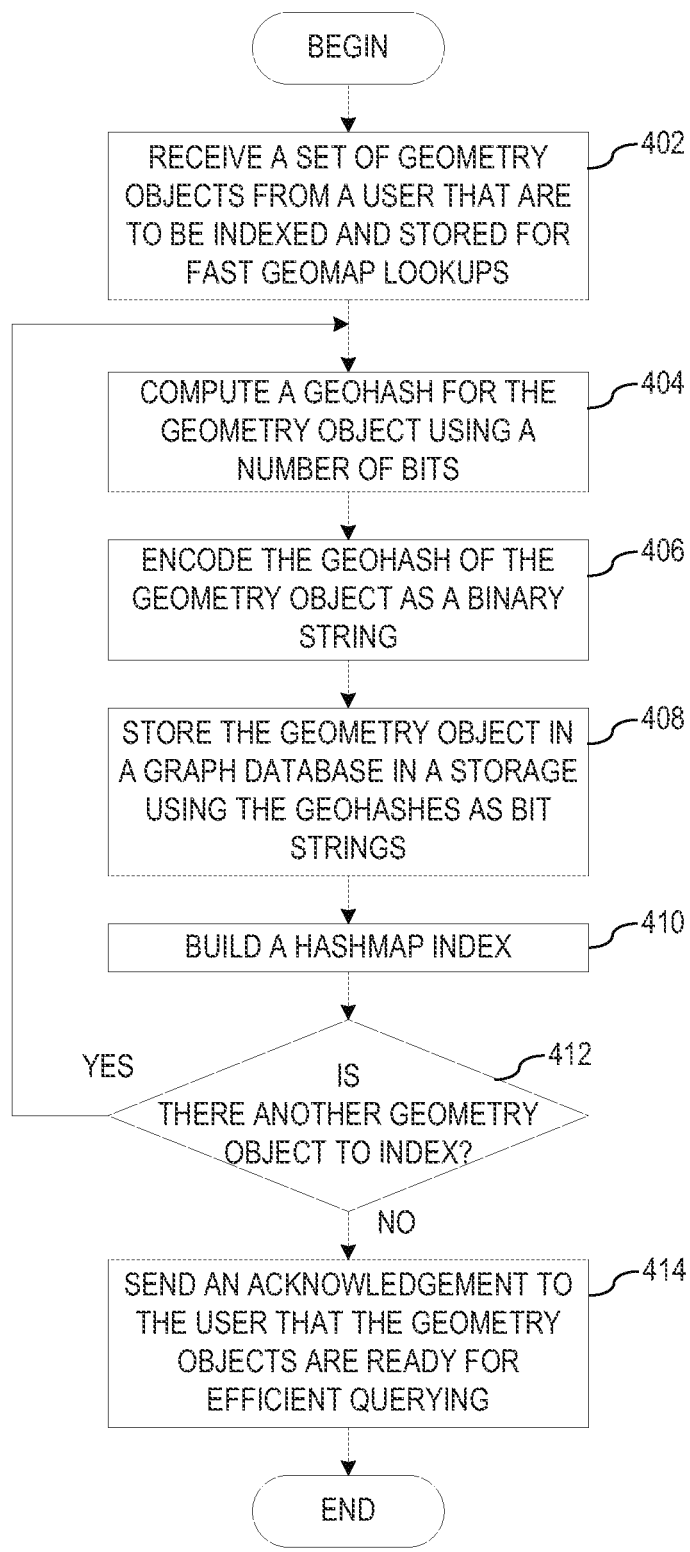
FIG. 4 depicts an exemplary flowchart of an indexing operation performed by a spatial graph indexing and querying mechanism in accordance with an illustrative embodiment.

FIG. 4 depicts an exemplary flowchart of an indexing operation performed by a spatial graph indexing and querying mechanism in accordance with an illustrative embodiment. As the operation begins, indexing logic within the spatial graph indexing and querying mechanism receives a set of geometry objects from a user that are to be indexed and stored for fast geomap lookups (step 402). As each geometry object in the set of geometry objects is received, the indexing logic utilizes geohashing logic within the spatial graph indexing and querying mechanism to compute a geohash (i.e. bit string) for the geometry object using a number of bits (step 404), the number of bits being a predetermined parameter chosen by the user. Once the geohashing logic generates the geohash for the geometry object, the indexing logic encodes the geohash of the geometry object as a binary string (step 406), for ease of reading American Standard Code for Information Interchange (ASCII) strings. The indexing logic stores the geometry object in a graph database in a storage using the geohashes as bit strings (step 408). Associated with the graph database, the indexing logic builds a hashmap index (step 410), which is an n×n table of the geometry objects and each geometry object's associated encoded geohash. The indexing logic then determines whether there is another geometry object to be indexed (step 412). If at step 412 the indexing logic determines that there is another geometry object to be indexed, then the operation returns to step 404. If at step 412 the indexing logic determines that there fails to be another geometry object to be indexed, the indexing logic sends an acknowledgement to the user that the geometry objects are ready for efficient querying based on range queries of their associated geohashes (bit strings) (step 414), with the operation terminating thereafter.

Figure 5A:
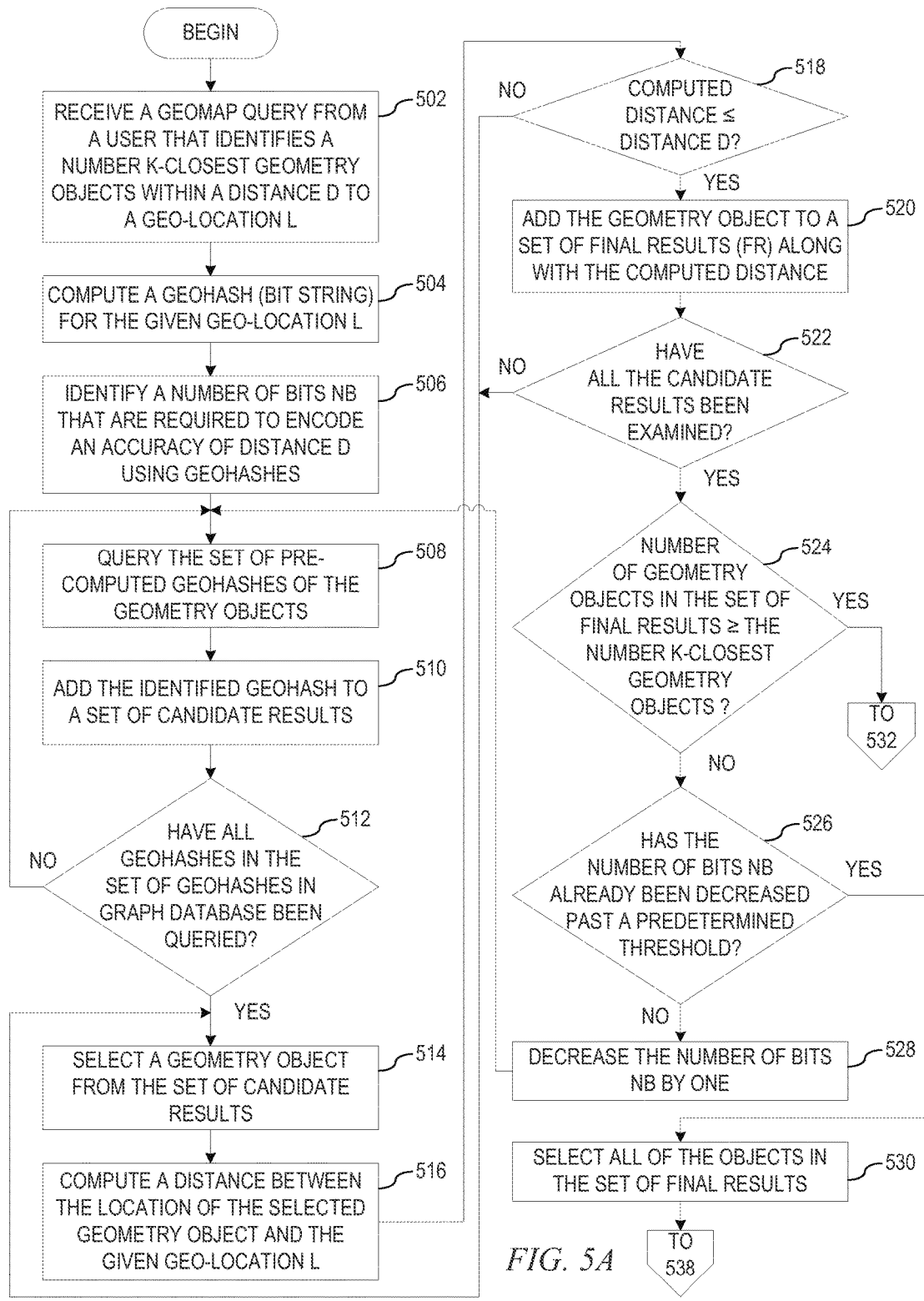
FIGS. 5A and 5B depict an exemplary flowchart of a querying operation performed by a spatial graph indexing and querying mechanism in accordance with an illustrative embodiment.
Figure 5B:
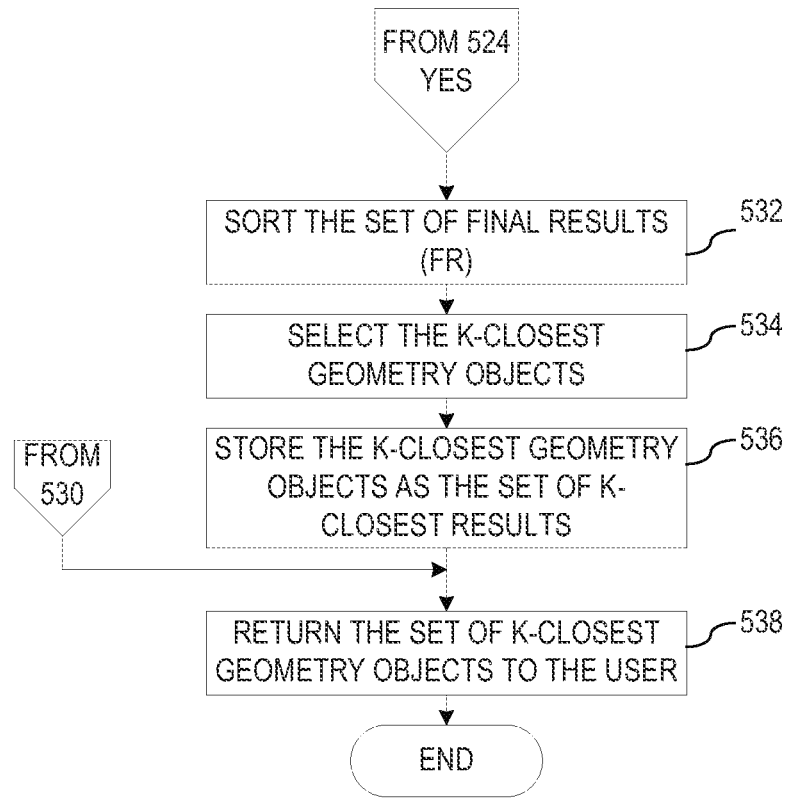

FIGS. 5A and 5B depict an exemplary flowchart of a querying operation performed by a spatial graph indexing and querying mechanism in accordance with an illustrative embodiment. As the operation begins, querying logic within the spatial graph indexing and querying mechanism receives a geomap query from a user that identifies a number K-closest geometry objects within a distance D to a geo-location L (step 502). The querying logic utilizes geohashing logic within the spatial graph indexing and querying mechanism to compute a geohash (bit string) for the given geo-location L (step 504). Based on the computed geohash of geo-location L, the querying logic identifies a number of bits NB that are required to encode an accuracy of distance D using geohashes (bit strings) (step 506). The querying logic then queries the set of pre-computed geohashes of the geometry objects stored in the graph database utilizing the hashmap index in order to identify all those geometry objects that have at least NB common-prefix bits to that of the number of bits NB of the geo-location L that are required to encode an accuracy of distance D using geohashes (bit strings) (step 508). This identification uses exact equality or prefix matching to retrieve pruned results efficiently. As each geohash from the set of geohashes in the graph database are identified, the querying logic adds the identified geohash to a set of candidate results CR whose geohashes have at least NB common-prefix bits in common with the geohash the given geo-location L (step 510).

The querying logic then determines whether all of the geohashes in the set of geohashes in graph database have been queried with respect to the given geo-location L (step 512). If at step 512 the querying logic determines that not all of the geohashes in the set of geohashes in graph database have been queried, then the operation returns to step 508. If at step 512 the querying logic determines that all of the geohashes in the set of geohashes in graph database have been queried, the querying logic selects a geometry object from the set of candidate results (CR) (step 514) and computes a distance between the location of the selected geometry object and the given geo-location L (step 516). The querying logic then determines whether the computed distance between the location of the selected geometry object and the given geo-location L is less than or equal to the distance D (step 518). If at step 518 the querying logic determines that the computed distance between the location of the selected geometry object and the given geo-location L is less than or equal to the distance D, then the querying logic adds the geometry object to a set of final results (FR) along with the computed distance between the location of the selected geometry object and the given geo-location L (step 520).

From step 520 or if at step 518 the querying logic determines that the computed distance between the location of the selected geometry object and the given geo-location L is not less than or equal to the distance D, the querying logic determines whether all of the geometry objects in the set of candidate results CR have been examined (step 522). If at step 522 the querying logic determines that there is more geometry object in the set of candidate results CR to examine, then the operation returns to step 514. If at step 522 the querying logic determines that there are no more geometry objects in the set of candidate results CR to examine, then the querying logic determines whether the number of geometry objects in the set of final results (FR) is greater than or equal to the number K-closest geometry objects from the geomap request (step 524). If at step 524 the querying logic determines that the number of geometry objects in the set of final results (FR) fails to be greater than or equal to the number K-closest geometry objects from the geomap request, then the querying logic determines whether the number of bits NB has already been decreased past a predetermined threshold (step 526). If at step 526 the number of bits NB has not already been decreased past the predetermined threshold thereby maintaining the accuracy of distance D, the querying logic decreases the number of bits NB that are required to encode an accuracy of distance D using geohashes (bit strings) by one (step 528), thereby forming a new number of bits NNB, with the operation returning to step 508 thereafter. If at step 526 the number of bits NB has already been decreased past the predetermined threshold thereby maintaining the accuracy of distance D, the querying logic selects all of the objects in the set of final results (FR) as the geometry objects that are within the distance D to the geo-location L (step 530), with the operation proceeding to step 538 thereafter.

If at step 524 the querying logic determines that the number of geometry objects in the set of final results (FR) is greater than or equal to the number K-closest geometry objects from the geomap request, the querying logic sorts the set of final results (FR) to identify the geometry objects with the shortest distance to the given geo-location L (step 532). The querying logic then selects the K-closest geometry objects from the set of final results (FR) (step 534) and stores the K-closest geometry objects as the set of K-closest results (step 536). The querying logic then returns the set of K-closest geometry objects to the user (step 538), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms spatial graph indexing and querying mechanism that converts two-dimensional geometries to single-dimensional keys while preserving the spatial locality that may be efficiently executed using prefix matching, which results in improved querying time and reduced usage of compute resources. That is, a location is mapped to a binary string which may be used as a key for querying the geometry object data store. The returned values (geometries) are guaranteed to be in the vicinity of the key (location). Determination of K-closest geometry objects is performed by examining the distance from location to each of the pruned set of geometries, all of which multiple times faster than breaking down the query into a spatial counterpart and a graph counterpart, as is currently performed in the art.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory coupled to the processor, for spatial annotated graph queries, the method comprising:

generating, by indexing logic executed by the processor, an indexed set of geometry objects in a graph database, each geometry object in the indexed set of geometry objects identified by a geohash representing a unique coordinate pair of the geometry object identifying a unique geographical location on the Earth, wherein the indexed set of geometry objects is generated by generating a hashmap index of the set of received geometry objects;

receiving, by query logic executed by the processor, a geomap query to identify a number K-closest geometry objects from the indexed set of geometry objects in the graph database within a distance D to a geo-location L, the geo-location L identified by a unique coordinate pair of the geo-location L identifying a geographical location on Earth;

computing, by geohash logic executed by the processor, a geohash for the geo-location L;

identifying, by the query logic, a subset of geometry objects from the indexed set of geometry objects in the graph database having a number of prefix bits in the respective geohash in common with a number of bits NB in the prefix of the geohash of the geo-location L;

identifying, by the query logic, K-closest geometry objects from the subset of geometry objects that are closest to the geo-location L, wherein the K-closest geometry objects are identified by:

for each geometry object in the set of indexed geometry objects, computing, by the query logic, a distance between a location of the geometry object represented by the geohash associated with the geometry object and the geo-location L represented by the geohash associated with the geo-location L thereby forming a computed distance, wherein determining the computed distance using geohashes results in improved retrieval of spatial information;

determining, by the query logic, whether the computed distance between the location of the geometry object and the geo-location L is less than or equal to the distance D;

responsive to the computed distance between the location of the geometry object and the geo-location L being less than or equal to the distance D, adding, by the query logic, the geometry object to a set of final results (FR) along with the computed distance between the location of the geometry object and the geo-location L; and identifying, by the query logic, the K-closest geometry objects from the set of final results (FR) based on the computed distance between the location of the geometry object and the geo-location L; and returning, by the query logic, the K-closest geometry objects to a user who submitted the geomap query.

2. The method of claim 1, further comprising:

responsive to the set of final results (FR) failing to comprise K-closest geometry objects, decreasing, by the query logic, the number of bits NB of the geo-location L by one thereby forming a new number of bits NNB;

identifying, by the query logic, a new set of geometry objects from the indexed set of geometry objects having the number of prefix bits in the respective geohash in common with the new number of bits NNB of the geo-location L; and identifying, by the query logic, the K-closest geometry objects from the set of geometry objects that are closest to the geo-location L.

3. The method of claim 1, further comprising:

responsive to the set of final results (FR) failing to comprise K-closest geometry objects and responsive to the number of bits NB being decreased past a predetermined threshold thereby decreasing an encoded accuracy of the distance D, identifying, by the query logic, all of the geometry objects in the set of final results (FR) as the geometry objects that are within the distance D to the geo-location L.

4. The method of claim 1, wherein the number of bits NB are identified based on an encoded accuracy of the distance D.

5. The method of claim 1, wherein the indexed set of geometry objects is generated by the method comprising:

for each received geometry object in a set of received geometry objects:

computing, by the indexing logic, a geohash for the received geometry object using an identified number of bits; and storing, by the indexing logic, the received geometry object in the graph database using the geohashes as bit strings; and generating, by the indexing logic, the hashmap index of the set of received geometry objects, thereby generating the indexed set of geometry objects.

6. The method of claim 5, further comprising:

encoding, by the indexing logic, the geohash of the received geometry object as a binary string.

7. The method of claim 5, wherein the identified number of bits NB is predetermined by a user.

* * * * *